United States Patent [19]

Cooper et al.

[11] 4,035,357
[45] July 12, 1977

[54] IMPROVED POLYPHENYLENE ETHER POLYMERIZATION PROCESS USING METHYLENE CHLORIDE AS SOLVENT

[75] Inventors: Glenn Dale Cooper, Delmar; Irwin Schraga, Guilderland, both of N.Y.

[73] Assignee: General Electric Company, Pittsfield, Mass.

[21] Appl. No.: 733,223

[22] Filed: Oct. 18, 1976

[51] Int. Cl.² .......................................... C08G 65/44
[52] U.S. Cl. ............................................ 260/47 ET
[58] Field of Search ............................... 260/47 ET

[56] References Cited

U.S. PATENT DOCUMENTS

| 3,432,466 | 3/1969 | Hay | 260/47 |
| 3,984,374 | 10/1976 | Cooper et al. | 260/47 ET |
| 3,988,297 | 10/1976 | Bennett et al. | 260/47 ET |

*Primary Examiner*—Lester L. Lee
*Attorney, Agent, or Firm*—William F. Mufatti; Granville M. Pine; Edward A. Hedman

[57] ABSTRACT

A novel process is disclosed for the polymerization of phenols, e.g., xylenols, and recovery of polyphenylene ethers from the polymerization mixture. The method is based on the use of hot methylene chloride as a reaction solvent, elevated oxygen pressure and separation of the polyphenylene ether as a solid complex with methylene chloride upon cooling. Also a feature is the recycle and recovery of methylene chloride.

11 Claims, No Drawings

IMPROVED POLYPHENYLENE ETHER POLYMERIZATION PROCESS USING METHYLENE CHLORIDE AS SOLVENT

This invention provides an improved process for the polymerization of phenols and recovery of polyphenylene ethers from polymerization solutions by the use of a methylene chloride solvent at elevated temperature and pressure followed by cooling and precipitating a complex of the polyphenylene ether and methylene chloride and recycle and recovery of the methylene chloride.

BACKGROUND OF THE INVENTION

The polyphenylene ethers and processes for their preparation are known in the art and described in numerous publications including Hay, U.S. Pat. No. 3,306,874 and 3,306,875, both of which are incorporated by reference. Other patents which show the preparation of polyphenylene ethers include Bennett and Cooper, U.S. Pat. Nos. 3,639,656, and 3,838,102, as well as Cooper and Bennett, U.S. Pat. Nos. 3,642,699, 3,661,848 and 3,733,299, which are also incorporated by reference.

The processes most generally used to produce the polyphenylene ethers involve the self-condensation of a monovalent phenol in the presence of an oxygen-containing gas and a catalyst comprising a metal-amine complex.

These processes are run in the presence of an organic solvent and the reaction is usually terminated by removal of the catalyst from the reaction mixture.

The product is usually recovered by adding an antisolvent to the reaction solution in an amount sufficient to precipitate the polymer. The antisolvent is soluble in the polymerization solvent, but does not dissolve the polymer.

It is known, for example, from A. Factor, Jr. Polymer Sci. B, 7, 205 (1969), that polyphenylene ethers dissolve readily in methylene chloride, but precipitate on standing in the form of a crystalline polyphenylene ether-$CH_2Cl_2$ complex. The complex loses methylene chloride on heating or simply on air drying to yield amorphous polyphenylene ethers. Attempts have been made to make use of the unusual solubility behavior of poly(2,6-dimethyl-1,4-phenylene)ether in methylene chloride to isolate the resins from reaction mixtures without the use of an antisolvent, but polymers suitable for molding applications have not been obtained. For example, when the polymerization is carried out in methylene chloride solvent, the polymer precipitates before it reaches high molecular weight; furthermore, the precipitate carries with it a large portion of the copper component of the polymerization catalyst; and the copper cannot easily be removed from the polymer by washing with water, methanol, acetic acid, etc.

It has now been discovered that high molecular weight polyphenylene ether (I.V. as high as 0.70 dl./g.) can be produced in methylene chloride solution without precipitation of the complex by carrying out the polymerization at a temperature greater than 40° C. Since this is above the atmospheric boiling point of the solvent, it is necessary to carry out the reaction in a closed system under oxygen pressure, to prevent loss of the solvent and to provide sufficiently high oxygen concentration in solution for the polymerization reaction. A pressure of 25 and, preferably, 30 psig is sufficient to produce high I.V. polymer is less than two hours at a xylenol: $CuBr_2$ : DBA ratio of 300 : 1 : 45, if poly(2,6-dimethyl-1,4-phenylene)ether is the desired product.

Because the polymer does not precipitate from solution during the polymerization, and remains dissolved for at least a short time after the reaction mixture is removed from the reactor, the catalyst can be extracted from the hot solution (either with aqueous acid, which removes both the amine and metal ion catalyst components, or with a chelating agent such as salts of ethylenediaminetetraacetic acid (EDTA) or nitrilotriacetic acid (NTA) or the like, to remove only the metal ion). The solution can then be cooled, causing the polymer complex to precipitate out, and the polymer complex then can be isolated by filtration or centrifuging.

Essential features of the discovery are:
i. Polymerization in methylene chloride solution at a temperature of 40° C. or above, under oxygen pressure; and
ii. Cooling the polymer solution to room temperature or below to precipitate the polymer-methylene chloride complex.

Preferred features comprise:
iii. Extraction of catalyst from hot solution; and
iv. Separation of the complex by filtration or centrifuging and removal of the methylene chloride from the complex by heating.

The major advantage of the procedure is that no antisolvent is required for precipitation of the polymer, so that the substantial cost involved in separation of the solvent and antisolvent and recovery of the antisolvent by distillation is eliminated. A second advantage is that the polymer is amorphous, whereby polyphenylene ethers are more easily blended by coextrusion with other resins, such as polystyrene, than the partially crystalline polymers obtained by the usual commercial processes, in which an antisolvent such as methanol is added to the polymer solution to precipitate the polymer. The amorphous polyphenylene ether may be coextruded at lower temperatures and at higher rates than partially crystalline polyphenylene ethers, and the resulting blends, especially those containing relatively small proportion of the polyphenylene ether, have improved physical properties. See, e.g., U.S. Pat. No. 3,960,811, incorporated herein by reference.

The polymers obtained by the process have a yellow color, but blends with polystyrene have physical properties equal to those of blends made with polyphenylene ethers isolated by conventional antisolvent precipitation techniques, so that they are suitable for applications where color is not important. The color can be reduced to a level approximating that obtained by methanol precipitation by redissolving the powder in hot methylene chloride, then cooling and separating the polymer-methylene chloride complex.

As has been mentioned, the crude polymer obtained by the new process is highly colored by diphenoquinone and other colored byproducts of the reaction. The color can be reduced to an acceptable level by repeated washing of the precipitated complex with methylene chloride, but this results in a significant reduction in yield, as well as more than doubling the total amount of solvent which must be recovered by distillation. It is a further discovery that both of these disadvantages can be partially overcome by a two-cycle solvent system, and this also forms part of the present invention.

In this two-cycle solvent system, the polymer is filtered from the reaction mixture and washed with a small amount of methylene chloride, and methylene chloride filtrate and wash combined. The polymer is then washed with methylene chloride in an amount equal to the original solvent volume. The first methylene chloride fraction is then distilled to recover pure solvent for subsequent washing operations, while the "wash" methylene chloride is decanted to remove any aqueous phase and used without purification, as the solvent for the next polymerization. The polymer present in the wash liquid is thus recovered at the end of the polymerization; the small amount of quinones and other low molecular weight products have no apparent effect on the quality of the polymer produced.

Accordingly, it is an object of this invention to provide an improved process for the preparation of a polyphenylene ether resin with the aim of obtaining a polyphenylene ether resin with a reduced number of process steps and without the need to use an antisolvent.

It is also an object of this invention to provide a process which permits the removal of color producing compounds from polyphenylene ether and reducing the amount of solvent required.

DESCRIPTION OF THE INVENTION

This invention provides in a process for forming a polyphenylene ether by an oxidative coupling reaction in the presence of a metal ion-amine complex catalyst in a reaction solution of a phenol and said catalyst, the improvement which comprises carrying out the reaction in a closed system, using methylene chloride as a solvent, at a temperature above at least about 40° C., and under an oxygen or oxygen-containing gas pressure between 25 and 300 psig, cooling to precipitate a polymer-methylene chloride complex, and thereafter dissociating the solid polymer-methylene chloride complx obtained thereby.

According to a preferred aspect of the present invention, the process will be carried out as described above but prior to dissociation of the complex of polyphenylene ether and methylene chloride there are included steps comprising distilling the separated reaction solvent to produce a wash solvent, washing the solid complex with the wash solvent in an amount sufficient to reduce to color bodies to a desirable, predetermined level, and, after separating the wash solvent and removing any aqueous phase which may be present, recycling the separated wash solvent to a subsequent polymerization as a reaction solvent.

Another preferred feature is to carry out the process as described above, but also includes the step of contacting the reaction solution while hot with an extractant, e.g., aqueous acid of a chelating agent, e.g., a salt of ethylenediaminetetraacetic acid or of nitrilotriacetic acid.

In the preferred aspect, the ethylenediaminetetraacetic acid salt can be added in the form of an aqueous solution although this is not essential. If a dry solid is employed, the free water formed in the polyphenylene ether synthesis will ordinarily be sufficient to dissolve the salt.

The preferred salts of ethylenediaminetetraacetic acid are the di-, tri- and tetra-sodium salts. Usually, these salts are employed as a 1 to 50% by weight aqueous solution, and more preferably, a 10 to 40% by weight aqueous solution. The volume of such a solution to be used is selected so that a molar ratio of the salt to metal ion is in the range of 1:1 to 10:1 or more. The preferred range is 1:1 to 2:1.

Any conventional metal ion used in the past for forming the complex catalyst will be used in the present invention. By way of illustration, it can comprise copper, manganese, cobalt, nickel, vanadium, chromium and salts thereof, but copper is preferred. Conventional components such as primary, secondary and tertiary amines are utilized.

The preferred polyphenylene ether is of the formula:

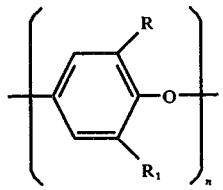

wherein the oxygen ether atom of one unit is connected to the benzene nucleus of the next adjoining unit, $n$ is an integer of at least 50; and R and $R_1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

The preferred polyphenylene ether is poly(2,6-dimethyl-1,4-phenylene) ether.

The polyphenylene ether-forming reaction can be carried out under a wide variety of well known process conditions. Merely by way of illustration, a copper halide can be mixed with an aliphatic amine in the methylene chloride, then oxygen or an oxygen-containing gas can be pressured into the closed system containing the appropriate phenol in the agitated reaction mixture at the elevated temperature of at least 40° C. The degree of polymerization is primarily controlled by the reaction time, although catalyst activity, promoters, temperature, oxygen pressure (or partial pressure) and other parameters have known effects. To save unnecessary explanation of those known process details, reference is made to the above-mentioned patents, and also to Russian Patent No. 295,781, published April 9, 1971, the disclosures of which are incorporated herein by reference.

At the point where the polymerization reaction reaches the desired degree of polymerization or molecular weight, the reaction solution will comprise a solution of polyphenylene ether, typically from 1 to 50% by weight and usually from 5 to 30% by weight, metal and amine, typically from about 0.005 to 1.5% by weight of metal and from about 0.5 to 2.0% by weight of amine and minor amounts of other materials, such as various promoters, byproducts, unreacted monomer, and the like. Such reaction solutons are then optionally treated with the chelating agents, then cooled for precipitation of the polyphenylene ether-methylene chloride complex in accordance with the present process.

The complex can be separated, e.g., by filtration and centrifugation. Methylene chlorid can be removed by exposure to air during which it automatically volatilizes, but gentle heating is preferred, because the process of decomposition of the complex is markedly accelerated.

The washing step to remove colored contaminants has been described above and will be exemplified in detail hereinafter.

In either event, the precipitated polyphenylene ether resins may be recovered by conventional methods and dried to form useful molding resins.

DESCRIPTION OF THE PREFERRED EMBODIMENTS

The following examples are for the purpose of illustration and are not to be construed as limiting the invention.

EXAMPLE 1

Catalyst is prepared by dissolving 0.42 g. of methyltrioctylammonium bromide and 1.23 g. of cupric bromide in 12 ml. of methanol, then adding this solution to 32.7 g. of di-n-butyl amine in 50 ml. of methylene chloride. The mixture is stirred for five minutes and transferred to a one-gallon stirred reactor with 1400 ml. of methylene chloride. The reactor is purged with oxygen, sealed, and pressurized to 30 psig with oxygen. The solution is stirred vigorously and a solution of 210 g. of 2,6-xylenol in 296 ml. of methylene chloride is added through a pump over a period of 15 minutes. The temperature of the mixture gradually increases to 41° C. and is then held at this temperature by circulating water from a constant temperature bath through an internal coil.

After two hours, the mixture is allowed to cool slightly and the pressure released. A solution made by diluting 5.5 g. of 38% aqueous trisodium salt of ethylenediaminetetraacetic acid with 20 ml. of water is added and the reactor is sealed, pressurized to 30 psig and again heated to 42° C. The mixture is stirred for ten minutes, withdrawn from the reactor, and transferred to a separatory funnel. After about 10 minutes, the methylene chloride is withdrawn and the upper aqueous phase discarded. The methylene chloride solution is again added to the separatory funnel. Within a short time, precipitation of the polymer begins and there is further separation of the aqueous phase. The lower phase, a slurry of the polymer in methylene chloride is again drawn off and the aqueous phase discarded. This process is repeated once more and the polymermethylene chloride slurry is cooled for one hour, with gentle stirring, in an ice bath. The polymer-methylene chloride complex is filtered off, washed with water, then with a small amount of methylene chloride, and dried under vacuum at 60° C. The poly (2,6-dimethyl-1,4-phenylene)ether has an intrinsic viscosity of 0.6 dl./g. in chloroform at 30° C., and contains only 23 ppm of copper. The polymer is completely amorphous, and has a glass transition temperature of 217° C.

The polymer is bright yellow in color (Color No. < 9.5). Ten grams of the dry polymer is added to 100 ml. of methylene chloride and the mixture is heated under reflux, with gentle stirring, for 30 minutes. The suspension is cooled in an ice bath for 30 minutes, filtered, washed with methylene chloride, and dried, yielding 7.9 g. of polyphenylene ether with color number of 2.9. Color number is a property used internally for process control, not a generally accepted polymer property like I.V., tensile strength, etc. It is obtained by measuring the percent transmission at 444 millimicrons of a 2% (wt./vol.) solution of PPO in chloroform, with a one centimeter path length. Color number is described by the formula:

$$100 - \% \text{ transmission}/10$$

COMPARISON A

This comparison is carried out as described in Example 1, except that the temperature is kept at 25° C. and the reactor is not sealed, but is equipped with a reflux condenser and a rapid stream of oxygen is introduced near the bottom of the vessel. After two hours, no polymer has precipitated, and no polymer is precipitated on addition of methanol.

COMPARISON B

This comparison is carried out as described in Example 1, with the reaction temperature at 42° C., but with an oxygen pressure of only 15 psig. Reaction is continued for two hours and the catalyst is extracted as described in Example 1. The polymer which precipitates from the methylene chloride solution on standing has an intrinsic viscosity of only 0.12 dl./g.

COMPARISON C

This comparison is carried out in the same way as Example 1, with oxygen pressure of 30 psig, but with the reaction temperature maintained at only 25 instead of 41° C. After 105 minutes, an aqueous solution of the trisodium salt of EDTA is added, the mixture is stirred for 10 minutes, and withdrawn from the reactor. The polymer-methylene chloride complex is out of solution. The aqueous phase is separated and the polymer methylene chloride suspension is washed with water and filtered as described in Example 1. It has an intrinsic viscosity of 0.48 dl./g. and contains a 110 ppm of copper, a substantial amount.

EXAMPLE 2

This is carried out in the same way as Example 1 except that 75 ml. of 50% aqueous acetic acid is used instead of trisodium EDTA to extract the catalyst and amine from the solution. The yield of dried polymer is 182 g., with an intrinsic viscosity of 0.63 dl./g., and a copper content of only 20 ppm.

EXAMPLE 3

Example 1 is repeated, except that both catalyst and xylenol are doubled, without increasing the volume of solvent. The aqueous trisodium salt of EDTA is pumped into the reactor after 105 minutes and then drawn off. The polymer is in solution when the mixture was drawn off but begins to precipitate almost immediately, so that separation of the aqueous phase cannot be accomplished before precipitation occurs. The mixture is allowed to stand for two hours at room temperature and then filtered and washed on the filter with a large amount of water, then with 500 ml. of methanol. The dried polymer contains only 12 ppm of copper.

To demonstrate the suitability of the products, 300 g. of polymer prepared as described in Example 1, 300 g. of Dylene 805 rubber-modified polystyrene, 3 g. of tridecylphosphite, 18 g. of triphenyl phosphate, 0.9 g. of zinc sulfide, and 0.9 g. of zinc oxide are blended together and extruded in a 28 mm twin-screw extruder. The extruded pellets are molded into standard test pieces on a 3 oz. injection molding machine. A second blend was made in the same way using polyphenylene ether prepared in toluene solution and precipitated with methanol in a known way. Physical properties of the blends are listed below.

| Property | (This Invention) Methylene Chloride Process | (Prior Art) Methanol- Precipitated |
|---|---|---|
| Tensile yield (psi) | 9800 | 9600 |
| Tensile strength (psi) | 8400 | 8400 |
| Elongation (%) | 50 | 63 |
| Izod Impact (ft.lbs./ in. of notch) | 3.0 | 2.5 |
| Gardner Impact (in. lbs.) | 140 | 125 |
| Heat Distortion Temp. (° F.) | 240 | 250 |

EXAMPLE 4

A solution of 2.46 g. of cupric bromide, 65.4 g. of dibutyl amine and a 0.82 g. of methyltrioctyl ammonium chloride in 1432 ml. of methylene chloride is placed in a one-gallon autoclave equipped with a turbine stirrer, cooling coils, and with an oxygen inlet near the bottom of the reactor. The vessel is purged with oxygen and sealed. A solution of 420 g. of 2,6-xylenol in a 314 ml. of methylene chloride is added to the stirred solution over a period of 20 minutes. Oxygen is admitted to maintain a pressure of 30 psig. The temperature gradually increases and is held at 40° to 42° C. by circulating water through the cooling coils. After 105 minutes, a solution of 11 g. of 38% $Na_3EDTA$ and 15 ml. of water is added. The pressure is released and the oxygen is displaced by nitrogen. The vessel is again sealed and gradually heated to a temperature of 146° F. over a period of 75 minutes, then held at this temperature for 30 minutes. The mixture is cooled to 37° C., removed from the reactor and cooled in an ice bath. The precipitate is filtered off and washed with water to remove the copper catalyst, and then washed on the filter with 600 ml. of methylene chloride. The filtrate and washings are set aside.

The polymer is then reslurried in 750 ml. of methylene chloride, filtered and the filtrate saved. This process is twice repeated and the filtrates from the three reslurries are combined and separated from the small amount of aqueous phase.

EXAMPLE 5

The polymerization of Example 4 is repeated, without the post-heating step under nitrogen, using as the solvent 1746 ml. of the methylene chloride recovered from the reslurry of the first polymer. This solvent contains a total of 10.5 g. of non-volatile residue. The total reaction time is 90 minutes. The yield of crude polymer was 407 g. (98.5%) with an intrinsic viscosity of 0.58 dl./g. Under comparable conditions with pure solvent yields of only 92 to 94% are obtained. The products made with this polymer have impact strength and other initial properties, the same as a control made with prior art polyphenylene ether resin.

EXAMPLE 6

Xylenol, 210 g., is polymerized as described in Example 4, using a total of 1746 ml. of methylene chloride, 32.7 g. of dibutylamine, 1.23 g. of cupric bromide, and 0.42 g. of methyltrioctylammonium chloride. After 100 minutes, a solution of 5.5 g. of 38% trisodium EDTA and 15 ml. of water is added. The mixture is withdrawn and cooled for several hours in an ice bath. The reactor is washed out with 500 ml. of methylene chloride and the wash also cooled to precipitate the polymer - $CH_2Cl_2$ complex. The polymer complex is filtered off, washed with water and dried. The total yield of dried polymer is 196 g. (95% of theoretical) with an intrinsic viscosity of 0.56 dl./g. One hundred ninety grams of this polymer is refluxed for four hours with 1500 ml. of methylene chloride. The suspension is poured off from a small amount of gelled polymer adhering to the walls, cooled in ice, and filtered. The precipitate is washed twice on the filter with 200 ml. of methylene chloride. The color number of the polymer, originally greater than 9.5, is reduced to only 6.1 by this procedure.

EXAMPLE 7

The polymerization of Example 6 is repeated, but using as the solvent, 1746 ml. of the methylene chloride filtrate from the preceding run. There is obtained 202 g. (99%) of poly(2,6-dimethyl-1,4-phenylene)ether with an intrinsic viscosity of 0.58 dl./g.

EXAMPLES 8 – 11

To compare the results obtained in methylene chloride solvent at temperatures below 40° C. and oxygen pressures below 25 lbs., a series of polymerizations are conducted under conditions as set forth in Example 1 with the cupric bromide of the catalyst replaced by a mixture of cupric chloride and sodium bromide in a ration of two moles of sodium bromide per mole of cupric bromide and with modifications and results outlined in Table 1:

Table 1

Formation of Polyphenylene Ethers in Methylene Chloride Solvent

| Ex. | Catalyst Ratio Xylenol:$CuCl_2$ NaBr:DBA* | Temp., ° C. | $O_2$ Press. (psig) | Time (min.) | I.V. dl./g. |
|---|---|---|---|---|---|
| 8 | 150:1:2:22.5 | 41 | 30 | 105 | .70 |
| 9 | 300:1:2:45 | 41 | 30 | 120 | .59 |
| 10 | 300:1:2:45 | 41 | 30 | 105 | .58 |
| 11 | 300:1:2:45 | 41 | 30 | 105 | .63 |
| D** | 300:1:2:45 | 30 | 0*** | 90 | .22 |
| E** | 300:1:2:45 | 30 | 0*** | 150 | .20 |
| F** | 150:1:2:22.5 | 30 | 0*** | 90 | .29 |
| G** | 300:1:2:45 | 30 | 30 | 120 | .38 |
| H** | 300:1:2:45 | 41 | 0*** | 90 | .09 |

* dibutylamine
** Comparison experiment
*** System open

It is seen that unless both temperature and oxygen pressure are kept above 40° C. and 25 psig, respectively, polymerization rate, as measured by intrinsic viscosity (I.V.) is so low as to be commercially unattractive.

EXAMPLES 12 – 34

To demonstrate the feasibility of forming polyphenylene ethers as complexes with methylene chloride over a range of conditions within the scope of the present invention, the procedure of Example 1 is repeated in a temperature range of 41° to 44° C. with the cupric bromide of the catalyst replaced by a mixture of cupric chloride and sodium bromide in a ratio of two moles of sodium bromide per mole of cupric chloride and with modifications and results outlined in Table 2:

Table 2

Polymerizations of 2,6-Xylenol at Elevated Pressure in Methylene Chloride Solvent

| Example | Catalyst Ratio Xylenol:$CuCl_2$ NaBr:DBA* | Solids (wt.%) | $O_2$, (psig.) | Time (min.) | I.V. (dl./g.) |
|---|---|---|---|---|---|
| 12 | 150:1:2:22.5 | 8.5 | 30 | 105 | .67 |
| 13 | 300:1:2:45 | 8.5 | 30 | 120 | .59 |

Table 2-continued

Polymerizations of 2,6-Xylenol at Elevated Pressure in Methylene Chloride Solvent

| Example | Catalyst Ratio Xylenol:CuCl$_2$:NaBr:DBA* | Solids (wt.%) | O$_2$ (psig.) | Time (min.) | I.V. (dl./g.) |
|---|---|---|---|---|---|
| 14 | 300:1:2:45 | 8.5 | 30 | 120 | .57 |
| 15 | 300:1:2:45 | 8.5 | 30 | 105 | .60 |
| 16** | 300:1:0:45 | 8.5 | 30 | 105 | .58 |
| 17 | 300:1:2:45 | 8.5 | 30 | 105 | .54 |
| 18 | 300:1:2:45 | 8.5 | 30 | 105 | .72 |
| 19 | 300:1:2:45 | 8.5 | 30 | 100 | .68 |
| 20*** | 300:1:2:45 | 8.5 | 30 | 90 | .68 |
| 21**** | 300:1:2:45 | 8.5 | 30 | 90 | .58 |
| 22***** | 300:1:2:45 | 12.0 | 30 | 90 | .30 |
| 23 | 300:1:2:45 | 12.0 | 30 | 100 | .68 |
| 24 | 300:1:2:45 | 12.0 | 30 | 80 | .52 |
| 25 | 300:1:2:45 | 16.0 | 30 | 80 | .66 |
| 26 | 300:1:2:45 | 16.0 | 30 | 70 | .63 |
| 27****** | 300:1:2:45 | 16.0 | 30 | 70 | .68 |
| 28 | 300:1:2:45 | 16.0 | 30 | 65 | .63 |
| 29 | 300:1:2:45 | 16.0 | 30 | 65 | .62 |
| 30 | 300:1:2:45 | 16.0 | 30 | 60 | .55 |
| 31 | 400:1:2:60 | 16.0 | 30 | 90 | .69 |
| 32 | 500:1:2:75 | 16.0 | 30 | 120 | .51 |
| 33 | 500:1:2:75 | 16.0 | 45 | 120 | .50 |
| 34 | 300:1:2:45 | 20.0 | 30 | 70 | .44 |

* dibutylamine
** CuBr$_2$ instead of CuCl$_2$
*** Recovered CH$_2$Cl$_2$ used as solvent, i.e., filtrate from a previous run purified by simple distillation
**** Recycled CH$_2$Cl$_2$ used as solvent, i.e., wash liquor from a previous run, used without purification
***** No quaternary ammonium salt in catalyst
****** No methanol in catalyst prep.

It can be seen that so long as the pressure is in excess of 25 psig, and the temperature is at least 40° C., the high molecular weight polymer is obtained in commercially attractive reaction times, even though the catalyst type and amount, the reaction solids content, the 2,6-xylenol concentration and the oxygen pressure is varied.

Other modifications and variations of the present invention are possible in the light of the above teachings. It is, therefore, to be understood that changes may be made in the particular embodiments of the invention described which are within the full intended scope of the invention as defined by the appended claims.

We claim:

1. In a process for the preparation of a polyphenylene ether by an oxidative coupling reaction in the presence of a metal ion-amine complex catalyst in a reaction solution of a phenol and said catalyst, the improvement which comprises carrying out the reaction in a closed system, using methylene chloride as a solvent, at a temperature above at least about 40° C., and under an oxygen or oxygen-containing gas pressure between 25 and 300 psig.

2. A process as defined in claim 1 wherein the polyphenylene ether is recovered by cooling the reaction mixture to precipitate a solid complex of polyphenylene ether and methylene chloride and the complex is then dissociated by heating to drive off the volatile methylene chloride component, leaving the polyphenylene ether in the form of an amorphous powder.

3. A process as defined in claim 1 wherein prior to dissociation of the complex of polyphenylene ether and methylene chloride, there are included steps comprising distilling the separated reaction solvent to produce a wash solvent, washing the solid complex with the wash solvent in an amount sufficient to reduce color bodies to a predetermined level and, after separating the wash solvent and removing any aqueous phase which may be present, recycling the separated wash solvent to a subsequent polymerization as a reaction solvent.

4. A process as defined in claim 1 which also includes the step of contacting the reaction solution while hot with an extractant for the catalyst.

5. A process as defined in claim 4 wherein said extractant comprises aqueous acid.

6. A process as defined in claim 4 wherein the metal ion component of the complex catalyst is a chelatable ion and said extractant comprises a salt of ethylenediaminetetraacetic acid, nitrilotriacetic acid or other chelating agent.

7. A process as defined in claim 1 wherein said polyphenylene ether is of the formula:

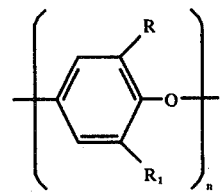

wherein the oxygen ether atom of one unit is connected to the benzene nucleus of the next adjoining unit; $n$ is an integer of at least 50; and R and R$_1$ are monovalent substitutents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

8. A process as defined in claim 1 wherein said polyphenylene ether is poly(2,6-dimethyl-1,4-phenylene ether).

9. A process as defined in claim 1 wherein the metal ion in the complex catalyst comprises copper.

10. In a process for the preparation of a polyphenylene ether by an oxidative coupling reaction in the presence of a copper-amine complex catalyst in a reaction solution of a phenol and said catalyst, the improvement which comprises carrying out the reaction in a closed system, using methylene chloride as a solvent, at a temperature of above at least about 40° C., and under an oxygen pressure of between 30 and 100 psig, terminating the reaction and extracting the catalyst by contacting the hot soluton with an aqueous solution of a salt of ethylenediaminetetraacetic acid, cooling the reaction solution to below about 25° C. to precipitate a complex of polyphenylene ether and methylene chloride, separating the complex from the cooled solution and removing the methylene chloride from the complex by heating.

11. A process as defined in claim 10 including washing the precipitated polymer-methylene chloride complex with a small amount of methylene chloride and combining the separated cooled solution with the methylene chloride washings, washing the complex of polymer and methylene chloride with the combined methylene chloride separated solution and washings in an amount sufficient to reduce color bodies to a predetermined level, and thereafter recycling the methylene chloride to a subsequent polymerization reaction as the solvent therefor.

* * * * *

UNITED STATES PATENT AND TRADEMARK OFFICE
CERTIFICATE OF CORRECTION

PATENT NO. : 4,035,357
DATED : July 12, 1977
INVENTOR(S) : Glenn Dale Cooper and Irwin Schraga It is certified that error appears in the above-identified patent and that said Letters Patent are hereby corrected as shown below:

In Col. 3, line 36, change "complx" to read -- complex --; on line 52, change "of" to read -- or --.

In Col. 5, line 55, change " $<$ " to read -- $>$ --.

Signed and Sealed this

Twenty-second Day of November 1977

[SEAL]

Attest:

RUTH C. MASON
Attesting Officer

LUTRELLE F. PARKER
Acting Commissioner of Patents and Trademarks